United States Patent Office 3,362,493
Patented Jan. 9, 1968

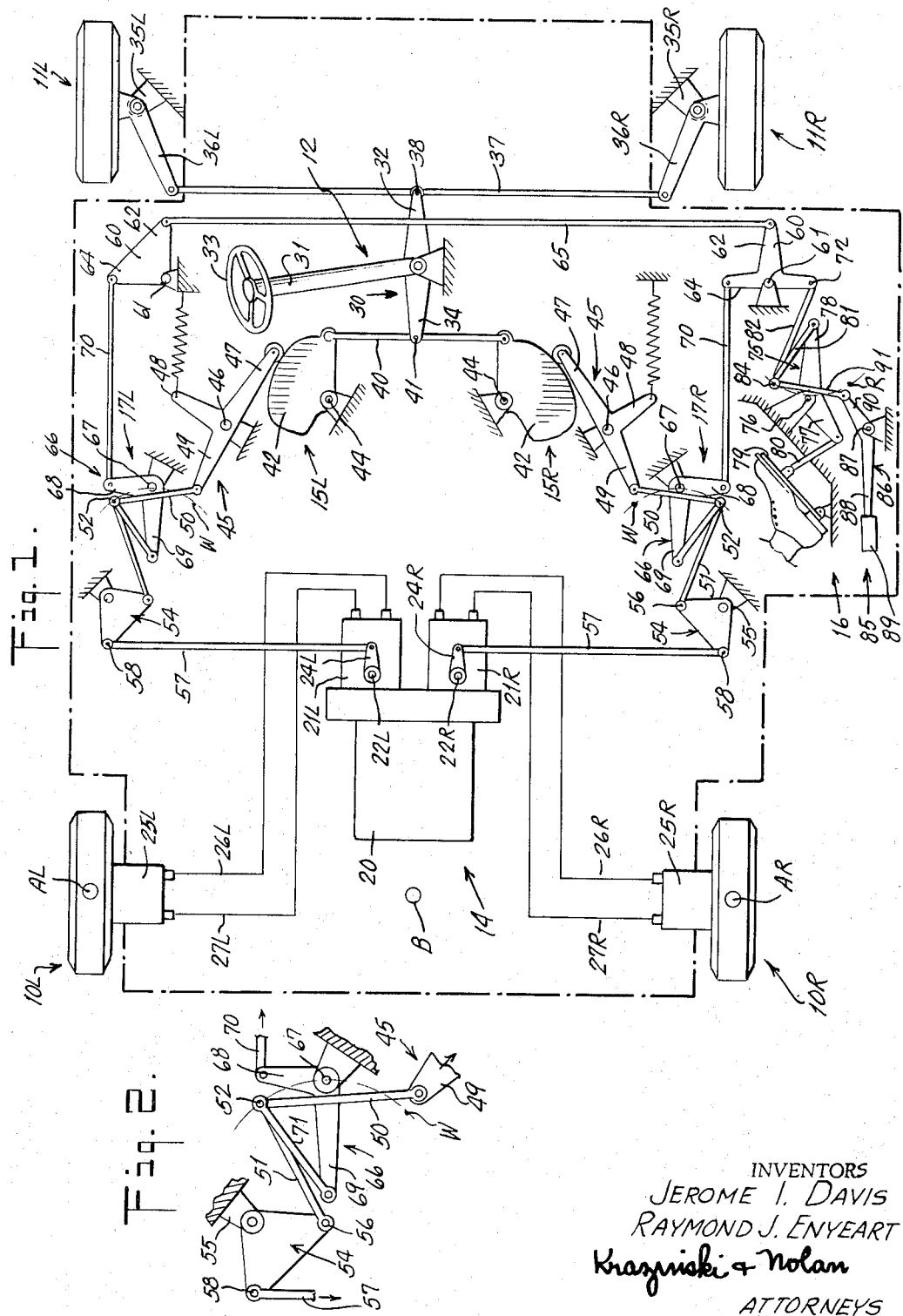

3,362,493
DRIVING AND STEERING SYSTEM FOR VEHICLES
Jerome I. Davis, Bedford, N.Y., and Raymond J. Enyeart, Westport, Conn., assignors to Condec Corporation, Stamford, Conn., a corporation of New York
Filed Aug. 27, 1965, Ser. No. 483,218
9 Claims. (Cl. 180—6.32)

ABSTRACT OF THE DISCLOSURE

A driving and steering system for vehicles having a variable ratio bell crank mechanism interposed between a speed control means and a steering mechanism for proportioning the relative speed of the vehicle driving wheels in response to turning movement of the steering mechanism.

---

The present invention relates to motor driven wheeled land vehicles and, more particularly, to an improved driving and steering system for a towing vehicle such as disclosed in United States Patent No. 3,024,858, dated Mar. 13, 1962, which vehicles must be extremely maneuverable.

The present invention aims to provide a wheeled vehicle equipped with separate driving and steering axles and having a coordinated driving and steering system which is so arranged that the driving wheels supply motive power as required to follow the path of the steered wheels. It thus becomes possible to turn on any radius down to zero, that is, to make a pivot turn about a point on the longitudinal center line or midway between the driving wheels when the steering wheels are turned approximately ninety degrees from the straight ahead position with the driving wheels propelled differentially at the same speed, one rotating forward and the other rotating backward. This provides a degree of maneuverability heretofore impossible to attain with an "Ackerman" system steered vehicle.

Preferably, the relative speed of the driving wheels is controlled to follows the radius of turn dictated by the steered wheels rather than merely allowing differential freedom of the driving wheels as is the usual custom. Theoretically, with this concept, no cornering forces need be supplied by the steered wheels during vehicle movement in a maneuver from straight ahead travel to a zero radius turn. As a practical matter, however, these wheels would provide some cornering forces under certain adverse conditions such as when either one or both of the driving wheels are skidding on slippery terrain due to ice, mud, oilslick and the like; or, when due to manufacturing tolerances, some inaccuracy existed in the coordinating system.

Accordingly, an object of the present invention is to provide an improved driving and steering system for towing vehicles.

Another object is to provide such a system which enables the vehicle to turn on any radius down to zero.

Another object is to provide such a system wherein normally cornering forces need not be supplied by the steered wheels.

Another object is to provide such a system which can be constructed of a wide variety and combination of mechanical, electrical and hydraulic components.

A further object is to provide such a system which is simple, practical and economical in construction and is reliable in operation.

Other and further objects will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are generally accomplished by providing a system wherein the outputs of the steering mechanism control motors for the driving wheels, and the outputs of an accelerator mechanism and a shifting mechanism are superimposed on the steering mechanism outputs to further control the motors.

A preferred embodiment of the invention has been chosen for purposes of illustration and description and is shown in the accompanying drawing, forming a part of the specification, wherein:

FIG. 1 is a schematic view of a coordinated driving and steering system in accordance with the present invention.

FIG. 2 is an enlarged fragmentary view of a section of the system illustrating the coordination of the steering and accelerator outputs to effect control of the motors.

Referring now in detail to FIG. 1 of the drawing, there is shown a system which generally comprises right and left vehicle driving wheels 10R and 10L, respectively, right and left vehicle steering wheels 11R and 11L, respectively, steering mechanism 12 for the steering wheels, a power plant 14 for the driving wheels, a cam-lever-link arrangement including right and left sections 15R and 15L, respectively, for controlling the driving wheels through output of the steering mechanism, accelerator mechanism 16, and a lever-link arrangement including right and left sections 17R and 17L, respectively, for further controlling the driving wheels through the accelerator mechanism.

The power plant 14 comprises an engine 20, hydraulic variable displacement, reversible flow pumps 21R and 21L driven by the engine and controlled by conventional servos 22R and 22L, respectively, through actuators 24R and 24L, and reversible fixed displacement motors 25R and 25L supplied with hydraulic fluid through lines 26R, 27R, 26L and 27L for driving the wheels 10R and 10L, respectively.

The steering mechanism 12 comprises a pivotally mounted lever 30 adapted to be rocked through a steering post 31 operated by a wheel 33 and having arms 32 and 34, structures 35R and 35L for pivotally mounting the axles of the wheels 11R and 11L including knuckle arms 36R and 36L, and a bar 37 connecting the free ends of the knuckle arms and having the arm 32 of the lever 30 pivotally connected thereto at about its midpoint 38.

The cam-lever-link arrangement sections 15R and 15L are identical and the input of both sections is connected to a link or bar 40 having the arm 34 of the lever 30 pivotally connected thereto at about its midpoint 41.

The sections 15R and 15L each comprise a cam 42 pivotally mounted at 44 and having one end of the link 40 pivotally connected thereto; a lever 45 pivotally mounted at 46 having a cam follower arm 47, a spring loaded arm 48 and an arm 49; a link 50 (FIG. 2) pivotally connected to the arm 49; a link 51 pivotally connected to the link 50 at 52, a bell crank lever 54 pivotally mounted at 55 and having the link 51 pivotally connected thereto at 56; and a link 57 having one end pivotally connected to the lever 54 at 58 and having the other end connected to one of the actuators 24R, 24L.

The lever-link arrangement sections 17R and 17L are substantially identical and the output of each section is connected, as shown, to its associated section 15R, 15L at 52.

Each of the sections 17R and 17L comprises a lever 60 pivotally mounted at 61 having an arm 62 and an arm 64; a link or bar 65 interconnecting the arms 62; a bell crank lever 66 pivotally mounted at 67 and having an arm 68 and an arm 69; a link 70 pivotally connected between the arms 64 and 68; and a link 71 pivotally connected at one end to the arm 69 and at the other end at 52 (FIG. 2). In one of the sections 17R and 17L, for example in section 17R as shown herein, the lever 60 has a third arm 72 serving as an input for connection to the accelerator mechanism 16, as about to be described.

The accelerator mechanism 16 comprises a lever 75 pivotally mounted at 76 and having arms 77 and 78; a foot pedal 79; a link 80 pivotally connected between the foot pedal 79 and the arm 77 of the lever 75; a link 81 having one end pivotally connected to the arm 78 of the lever 75; and a link 82 having one end pivotally connected to the arm 72 of the lever 60 and having its other end pivotally connected to the other end of the link 81 at 84.

The accelerator mechanism 16 further is provided with a selector mechanism 85 for operating the outputs of the lever-link arrangements to shift the actuators of the servos in forward, neutral and reverse positions. This shifting mechanism 85 comprises a lever 86 pivotally mounted at 87 and having an arm 88 provided with a handle 89 and having an arm 90; and a link 91 having one end pivotally connected to the arm 90 and having its other end pivotally connected to the links 81 and 82 at 84.

In operation, turning of the steering wheel 33 steers the wheels 11R and 11L in a conventional manner, although through much longer angles than normally to accomplish turns about any point along the driving wheel axis center-line including points AR, AL and B. Simultaneously, the cams 42 position through sections 15R and 15L the actuators 24R and 24L, respectively, to vary the input to output ratios of the control system which dictates the amount of differential of flow of the pumps 21R and 21L when a speed signal is superimposed by the accelerator mechanism 16.

For example, if it is desired to turn about point AL, the steering wheels are turned to track this radius which, by reason of the shape of the cams 42, positions the output point 52 of the section 15L to coincide with the pivot point 67 of the section 17L while leaving the output point 52 of the section 15R at a maximum ratio. Thus, when the accelerator pedal 79 is depressed, speed signals are imposed on the arm 68 of both levers 66 but only the section 17R will produce an output signal. Turning about the point AL is then accomplished, at which point the wheel 10L does not turn, the wheel 10R turns and the wheels 11R and 11L are steered to follow the prescribed radius.

In the event the wheels 11R and 11L are steered to turn about the point B, the cams 42, by reason of their shape, position the points 52 of the sections 15R and 15L so that one of the points 52 coincides with a point W while the other point 52 remains in its original position. This results in equal and opposite speed signals being superimposed on the output of the sections 15R and 15L by the sections 17R and 17L when the accelerator pedal is depressed, thereby causing the driving wheels 10R and 10L to rotate at the same speed but in opposite directions while the steering wheels 11R and 11L are tracking this turn.

The shifting mechanism 85 is actuated by the driver of the vehicle. While the control point 84 is at the position shown, the vehicle travels forwardly when the accelerator pedal is depressed. Conversely, when this point is shifted to the point R, the vehicle travels backwards upon depressing the accelerator pedal. When the control point 84 is shifted to coincide with the pivot point 76, the shifting mechanism is in a neutral position, whereby depression of the accelerator pedal does not produce any output signal to either of the pumps 21R, 21L.

From the foregoing description, it will be seen that the present invention provides a driving and steering system for vehicles which not only controls the speed and direction of the vehicle but renders the vhicle extremely maneuverable.

As various changes may be made in the form, construction, and arrangement of the parts herein, without departing from the spirit and scope of the invention and without sacrificing any of its advantages, it is to be understood that all matters are to be interpreted as illustrative and not in any limiting sense.

What is claimed is:

1. In a driving and steering system for vehicles, the combination of a pair of steering wheels, a pair of driving wheels, reversible motor means for each of said driving wheels, means including a servo for controlling the speed and the direction of operation of each of said motor means, steering mechanism for turning said steering wheels, cam-lever-link means having duplicate output sections responsive to said steering mechanism, and a variable ratio bell crank mechanism disposed between each of said servos and each of said output sections for proportioning the relative speed of said driving speed of said driving wheels in response to a turn radius prescribed by said steering mechanism.

2. In a system according to claim 1, including means for imparting to said available ratio bell crank mechanism a speed signal for driving said vehicle.

3. In a system according to claim 1, wherein said variable ratio bell crank mechanism comprises a bell crank with two arms and two links, one of said links being of the same length as one of said arms of said bell crank and being pivotally connected at one end to said one of said bell crank arms, the opposite end of said one of said links being connected to the other of said links, said other of said links being connected to said output section and thereby controlling the position of said one of said links.

4. In a driving and steering system for vehicles, the combination of a pair of steering wheels, a pair of driving wheels, reversible motor means for each of said driving wheels, means including a servo for controlling the speed and the direction of operation of each of said motor means, steering mechanism for turning said steering wheels, cam-lever-link means responsive to said steering mechanism and having two outputs for coordinating both of said servos to effect operation of said motor means, accelerator mechanism, lever-link means responsive to said accelerator mechanism having two outputs for superimposing an output on each of the outputs of said cam-lever-link means, and a variable ratio bell crank mechanism disposed between each of said servos and each of said outputs of said cam-lever-link means for proportioning the relative speed of said driving wheels in response to a turn radius prescribed by said steering mechanism.

5. In a system according to claim 4, including a source of power for each of said motor means under the control of said controlling means.

6. In a system according to claim 5, wherein said sources of power and said motor means have reversible inputs and outputs.

7. In a system according to claim 6, wherein said controlling means each includes an actuator, and said cam-lever-link means includes a cam, lever and link system having its input connected to said steering mechanism and having the outputs respectively connected to said variable ratio bell crank mechanisms.

8. In a system according to claim 7, wherein said lever-link means includes a lever and link system having its input connected to said accelerator mechanism and having the outputs respectively connected to the outputs of said cam-lever-link means.

9. In a system according to claim 8, including a shifting mechanism associated with said accelerator mechanism for shifting the outputs of said arrangements to operate said controlling means in forward, neutral and reverse positions.

References Cited

UNITED STATES PATENTS

| | | | |
|---|---|---|---|
| 2,651,377 | 9/1953 | Lapsley et al. | 180—6.3 |
| 2,774,434 | 12/1956 | Ferris | 180—6.3 |
| 2,941,609 | 6/1960 | Bowers et al. | 180—6.48 |
| 3,065,700 | 11/1962 | Blenkle | 180—6.48 |
| 3,138,218 | 6/1964 | Mark et al. | 180—6.3 |

FOREIGN PATENTS 137,017   3/1961   U.S.S.R.

BENJAMIN HERSH, *Primary Examiner.*

J. A. PEKAR, *Assistant Examiner.*